(12) United States Patent
Rask et al.

(10) Patent No.: US 7,769,505 B2
(45) Date of Patent: Aug. 3, 2010

(54) METHOD OF OPERATING A PLUG-IN HYBRID ELECTRIC VEHICLE

(75) Inventors: Eric M. Rask, Royal Oak, MI (US);
Robert D. Burns, Lake Orion, MI (US);
Mark A. Theobald, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 741 days.

(21) Appl. No.: 11/743,725

(22) Filed: May 3, 2007

(65) Prior Publication Data
US 2008/0275600 A1 Nov. 6, 2008

(51) Int. Cl.
*G01M 17/00* (2006.01)
*H02M 7/217* (2006.01)
*G06F 17/00* (2006.01)
(52) U.S. Cl. .................. 701/22; 701/36; 180/65.275
(58) Field of Classification Search ............ 701/22, 701/1, 36; 180/65.275, 65.29, 65.3, 65.245, 180/65.265; 363/124, 65, 40
See application file for complete search history.

(56) References Cited
U.S. PATENT DOCUMENTS

| | | | | |
|---|---|---|---|---|
| 5,285,862 | A * | 2/1994 | Furutani et al. | 180/65.245 |
| 2004/0066663 | A1 * | 4/2004 | Raichle | 363/40 |
| 2008/0169138 | A1 * | 7/2008 | Grand et al. | 180/65.2 |
| 2009/0242288 | A1 * | 10/2009 | Oyobe et al. | 180/65.265 |

* cited by examiner

*Primary Examiner*—Tan Q Nguyen
(74) *Attorney, Agent, or Firm*—Quinn Law Group, PLLC

(57) ABSTRACT

A method of operating a plug-in hybrid electric vehicle is provided including the steps of: A) determining whether the plug-in hybrid electric vehicle is receiving power from an external power source; B) disabling the operation of the plug-in hybrid electric vehicle and executing a thermal program if the plug-in hybrid electric vehicle is receiving power from the external power source, wherein the thermal program includes charging a high voltage battery and monitoring the state of charge of the high voltage battery; C) determining if the plug-in hybrid electric vehicle continues to receive power from the external power source; and D) enabling operation of the plug-in hybrid electric vehicle if the plug-in hybrid electric vehicle is no longer receiving power from the external power source.

20 Claims, 2 Drawing Sheets

METHOD OF OPERATING A PLUG-IN HYBRID ELECTRIC VEHICLE

TECHNICAL FIELD

The present invention relates to a method of operating a plug-in hybrid electric vehicle.

BACKGROUND OF THE INVENTION

Hybrid electric vehicles, which are powered with a combination of consumable fuel, such as fossil fuels, and electricity, typically stored within a battery, are becoming more prevalent in the automotive market. Such hybrid electric vehicles are displacing purely electric vehicles, as well as conventional vehicles powered solely by internal combustion engines.

The purely electric vehicle typically lacks an on-board means to recharge the battery and therefore must be recharged from an external power source, such as household alternating current, a publicly accessible recharging facility, or any other external power source compatible with the recharging system of the vehicle. By contrast, the hybrid electric vehicle is typically not recharged from an external power source, but is instead recharged using energy from an onboard means.

Typical hybrid electric vehicles incorporate both a battery powered electric motor and an internal combustion engine from which the battery may be recharged. Power may be provided to the vehicle drive system by the electric motor and/or the internal combustion engine. Hybrid electric vehicles can be refueled with fossil fuels, including but not limited to fuels which may be available from filling stations, without regard to availability of an external power source suitable for recharging the battery. Therefore, access to an external power source is typically not required for recharging a hybrid electric vehicle, since the batteries are recharged using power from the internal combustion engine.

With typical hybrid electric vehicles, the recharging of the battery using power from the internal combustion engine makes the cost of recharging proportional to the cost of consumable fuel. This is not the case with purely electric vehicles, where the battery is recharged from the external power source.

The present invention thus relates to plug-in hybrid electric vehicles, which differ from typical hybrid electric vehicles in that a plug-in hybrid electric vehicle has the ability to recharge its batteries either from an external power source, i.e. a power source outside the vehicle (such as household alternating current power), or from an onboard means (such as an internal combustion engine). Plug-in hybrid electric vehicles combine the ability of purely electric vehicles to recharge from an external power source using electric power generated by any cost-effective means available with the ability of hybrid electric vehicles to recharge using the power generated by the internal combustion engine.

SUMMARY OF THE INVENTION

A method of operating a plug-in hybrid electric vehicle is provided including the steps of: A) determining whether the plug-in hybrid electric vehicle is receiving power from an external power source; B) disabling the operation of the plug-in hybrid electric vehicle and executing a thermal program if the plug-in hybrid electric vehicle is receiving power from the external power source, wherein the thermal program includes charging a high voltage battery and monitoring the state of charge of the high voltage battery; C) determining if the plug-in hybrid electric vehicle continues to receive power from the external power source; and D) enabling operation of the plug-in hybrid electric vehicle if the plug-in hybrid electric vehicle is no longer receiving power from the external power source.

In a preferred embodiment, the method includes the further steps of: E) operating the plug-in hybrid electric vehicle in the purely electric mode of operation; F) monitoring the high voltage battery to determine a state of charge; G) determining if an internal combustion engine will be commanded to start within a predetermined amount of time; and H) performing at least one of heating the internal combustion engine by communicating heated engine coolant contained within a selectively dischargeable insulated container and energizing a catalyst heater to heat a catalyst mounted with respect to the internal combustion engine by discharging a selectively dischargeable energy storage device, if the internal combustion engine will be commanded to start within the predetermined amount of time or energy usage.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
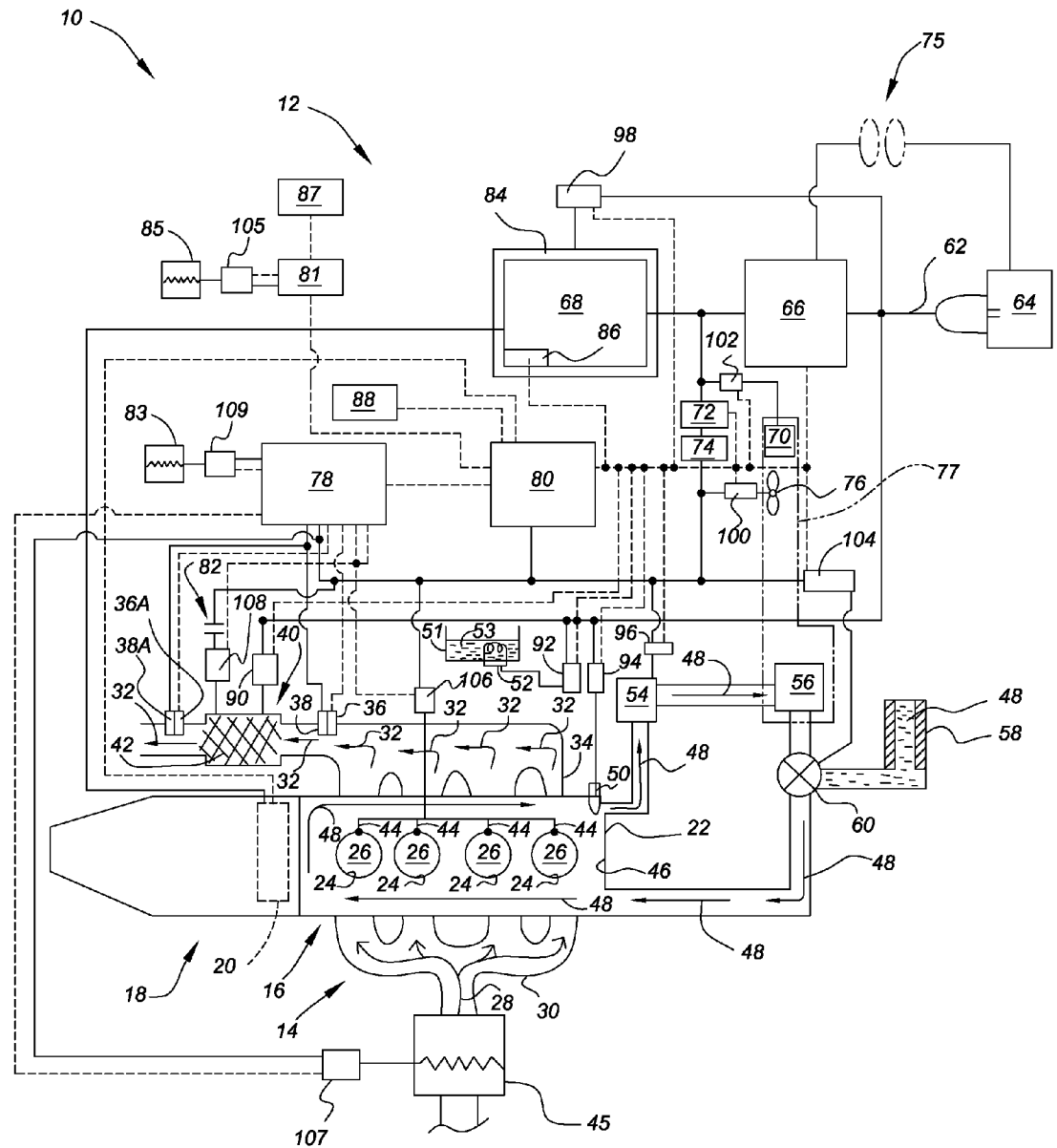
FIG. 1 is a schematic diagrammatic illustration of a portion of a plug-in hybrid electric vehicle incorporating a control system for a hybrid powertrain consistent with the present invention.

Referring to FIG. 1, there is shown a portion of a plug-in hybrid electric vehicle, generally indicated at 10. The plug-in hybrid electric vehicle 10 includes a control system 12 and a hybrid powertrain 14. The hybrid powertrain 14 includes an internal combustion engine 16, such as a spark-ignited or a compression-ignited engine, having a transmission 18 operatively connected thereto. The internal combustion engine 16 of FIG. 1 is a compression ignited diesel engine; however, those skilled in the art will recognize the claimed invention may be applied to hybrid powertrains incorporating a spark-ignited engine while remaining within the scope of that which is claimed. The internal combustion engine 16 provides torque to the transmission 18, which in turn, provides the requisite driving force to effect movement of the plug-in hybrid electric vehicle 10. At least one motor 20 may be provided to effect movement of the plug-in hybrid electric vehicle 10 in conjunction with, or in lieu of that supplied by the internal combustion engine 10, thereby providing hybrid functionality to the hybrid powertrain 14.

The internal combustion engine 16 includes a cylinder block 22 defining a plurality of cylinders 24. Each of the cylinders 24 at least partially defines a variable volume combustion chamber 26. Intake air, indicated by arrow 28, is communicated to each of the combustion chambers 26 of the internal combustion engine 16 through an intake manifold 30. A mixture of intake air 28 and fuel, not shown, is subsequently combusted within the combustion chambers 26 and the products of combustion, indicated by arrow 32, are exhausted from the internal combustion engine through an exhaust manifold 34. Lambda sensors or oxygen sensors 36 and 36A are mounted with respect to the exhaust manifold 34 and operate to determine the percentage of oxygen contained within the products of combustion 32 to determine the air to fuel ratio of the internal combustion engine 16 during operation. The air to fuel ratio is especially important to enable optimal performance and efficiency of the internal combustion engine 16. Heaters 38 and 38A are mounted with respect to the respective oxygen sensors 36 and 36A and are operable to heat the oxygen sensors 36 and 36A to enable operation during cold starting or re-start conditions of the internal combustion engine 16.

A catalyst 40, such as a three-way catalyst, is mounted downstream of the exhaust manifold 34 and is operable to reduce certain regulated emission constituents, such as oxides of nitrogen and hydrocarbons, from within the products of combustion 32. The catalyst 40 includes a catalyst heater 42. The catalyst heater 42 is preferably capable of heating or warming the catalyst 40 to, or close to, the catalyst light-off temperature during cold start of the internal combustion engine 16, thereby reducing the regulated emission constituents at start up of the internal combustion engine 16. To aid in starting the internal combustion engine 16, a glow plug 44 is provided within each of the combustion chambers 26. The glow plugs 44 operate to heat intake air 28 and fuel within the combustion chambers 26, thereby providing a more favorable condition for combustion within the combustion chambers 26. Additionally, an intake air heater 45 is provided at the inlet of the intake manifold 30 to heat the intake air 28 prior to entering the combustion chambers 26, thereby providing a more favorable condition for combustion within the combustion chambers 26 and to reduce the likelihood of white smoke production during cold start of the internal combustion engine 16.

The cylinder block 22 further defines a water jacket 46 configured to contain a predetermined amount of engine coolant, indicated by arrows 48. The engine coolant 48 extracts heat energy generated by operation of the internal combustion engine 16. A engine coolant heater 50 is provided to warm the coolant prior to the starting of the internal combustion engine 16 to reduce the friction and hydrocarbon emissions and improve combustion stability at start-up. Similarly, a engine oil heater 52 is mounted with respect to an oil reservoir or pan 51, shown apart from the internal combustion engine 16 for purposes of clarity, and operates to heat engine oil 53 contained therein. By heating the engine oil 53 prior to starting the internal combustion engine 16, the viscosity of the engine oil 53 is reduced such that the operating efficiency of the internal combustion engine is increased. A coolant circulation pump 54 is provided to circulate engine coolant 48 through the internal combustion engine 16 and a heater core 56 to provide heat to the interior of the plug-in hybrid electric vehicle 10 when the internal combustion engine 16 is not operating. An insulated storage tank 58, such as a dewar tank, is provided to contain a predetermined amount of heated engine coolant 48. A valve 60 is provided to selectively discharge the heated coolant 48 from the insulated storage tank 58 to warm the internal combustion engine 16. Those skilled in the art of vehicle design will recognize that a similar dewar tank and valve configuration may be used to store and discharge heated oil 53 to the internal combustion engine 16 such as, for example, a dry sump lubrication system.

As a matter of convention, solid lines interconnecting devices within the control system 12 indicate lines of power, whereas the dashed lines interconnecting devices within the control system 12 indicate signal lines. The control system 12 of the plug-in hybrid electric vehicle 10 includes an umbilical cord 62 operable to communicate power from an external source 64, such as household alternating current power, to the control system 12. The control system 12 further includes a high voltage battery charger 66 operable to charge a high voltage battery 68 and communicate high voltage direct current power to a heating, ventilation, and air conditioning compressor 70, and an auxiliary power module 72. The auxiliary power module 72 converts the high voltage direct current from the high voltage battery charger 66 to a low voltage direct current and operates to charge and maintain a low voltage battery 74. Those skilled in the art will recognize that power may be transferred from the external source 64 to the high voltage battery charger 66 via induction such as by coils 75, shown in phantom. In this embodiment one of the coils 75 is mounted with respect to the plug-in hybrid electric vehicle 10 while the other is mounted remotely therefrom, such as below the surface of a garage floor. By employing the coils 75 to inductively charge the high voltage battery 68, no physical connection between the external source 64 and the plug-in hybrid electric vehicle 10 is required.

The low voltage battery 74 and auxiliary power source 72 cooperate to power a fan 76 operable to blow either warm or cool air into the interior of the plug-in hybrid electric vehicle 10. The heater core 56, air conditioning compressor 70, and the fan 76 cooperate to form a heating, ventilation, and air conditioning system 77, delimited by a phantom line in FIG. 1. Additionally, the low voltage battery 74 and auxiliary power source 72 cooperate to power the glow plugs 44, the intake air heater 45, the coolant circulation pump 54 and the valve 60. The low voltage battery 74 and auxiliary power source 72 further cooperate to power an engine control module 78, a hybrid vehicle control module 80, and a body control module 81. The engine control module 78 communicates operating parameters of the internal combustion engine 16 to the hybrid vehicle control module 80, such as engine speed, engine load, engine coolant temperature, etc. and operates various engine-related devices such as a purge air scrubber heater 83. Those skilled in the art will recognize that the purge air scrubber heater 83 is operable to enhance adsorption of trapped hydrocarbons within the vehicles evaporative emissions system, not shown. Additionally, the hybrid vehicle control module 80 is operable to communicate engine control parameters to the engine control module 78 to effect operation of the internal combustion engine 16. The body control module 81 is operable to control passenger compartment features such as seat heaters 85 and an entertainment system 87 while monitoring the internal (i.e. passenger compartment) and external (i.e. ambient) air temperatures. A selectively dischargeable energy storage device 82, such as a capacitor and/or battery, is charged by the low voltage battery 74 and auxiliary power source 72.

The alternating current from the external power source 64 provides power to the heaters 42, 50, and 52 as well as a battery heater 84 operable to warm the high voltage battery 68 to prevent damaging the high voltage battery 68 in cold environments thereby increasing the reliability of the plug-in hybrid electric vehicle 10. A high voltage battery control module 86 is provided to monitor the state of charge of the high voltage battery 68 and provide this state of charge information to the hybrid vehicle control module 80. A user interface 88 communicates with the hybrid vehicle control module 80 to allow the operator of the plug-in hybrid electric vehicle 10 to program various aspects of the control system 12 to be discussed hereinbelow with reference to FIG. 2.

The hybrid vehicle control module 80 selectively controls and monitors the operation of the catalyst heater 42, engine coolant heater 50, engine oil heater 52, coolant circulation pump 54, battery heater 84, air conditioning compressor 70, fan 76, and valve 60 by selectively actuating respective relays 90, 92, 94, 96, 98, 100, 102, and 104. The body control module 81 selectively controls and monitors the operation of the seat heater 85 by selectively actuating a relay 105. Similarly, the engine control module 78 selectively controls and monitors the operation of the glow plugs 44, the intake air heater 45, the energy storage device 82, and the purge air scrubber heater 83 by selectively actuating respective relays 106, 107, 108, and 109. The engine control module 78 is configured to receive a signal from the oxygen sensors 36 and 36A indicating the state of operation of the internal combustion engine 16, i.e. rich or lean of stoichiometric engine operation.

Figure 2:
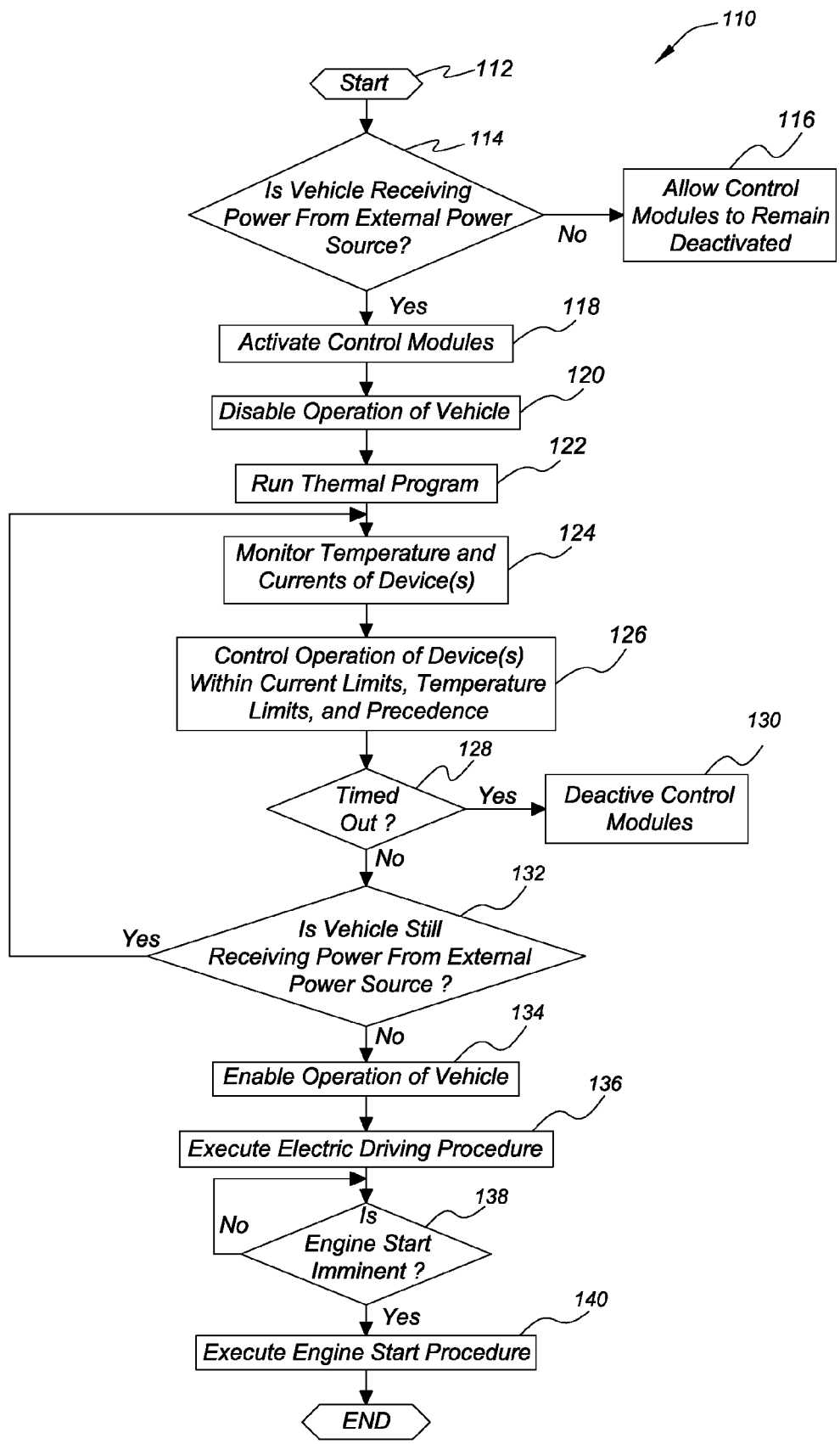
FIG. 2 is a method, depicted in flow chart format, illustrating various steps for operating the plug-in hybrid electric vehicle of FIG. 1.

Referring to FIG. 2, and with continued reference to FIG. 1, there is shown a method 110 of operating the plug-in hybrid electric vehicle 10. The hybrid vehicle control module 80 is preferably configured or programmed to operate the plug-in hybrid electric vehicle 10 in accordance with the method 110. The method 110 begins at step 112 and proceeds to step 114 where a determination is made whether the umbilical cord 62 of the plug-in hybrid electric vehicle 10 is connected to the external power source 64, thereby receiving power therefrom. If not, the engine control module 78, hybrid vehicle control module 80, and the high voltage battery control module 86 are allowed to "sleep" or remain deactivated, as indicated at step 116. Alternately, if it is determined that the umbilical cord 62 of the plug-in hybrid electric vehicle 10 is connected to the external power source 64, the method 110 will proceed to step 118.

At step 118, the engine control module 78, hybrid vehicle control module 80, and the high voltage battery control module 86 are activated. At step 120, the hybrid vehicle control module 80 will disable operation of the hybrid electric vehicle 10. This function prohibits the inadvertent drive-off of the hybrid electric vehicle while the umbilical cord 62 is connected to the external power source 64.

At step 122, a thermal program is initiated. The thermal program includes customer stored programs, such as passenger compartment desired temperature and expected commuting start times, and manufacturer stored programs, such as fuel economy and emissions related programs. The customer stored programs are preferably input to the hybrid vehicle control module 80 through the user interface 88. The thermal program includes commanding the high voltage battery charger 66 to charge the high voltage battery 68. The high voltage battery control module 86 will provide state of charge information to the hybrid vehicle control module 80. The energy cost required to charge the high voltage battery 68 may be reduced by using power from the external power source 64 in lieu of the internal combustion engine 16, since the price of household electricity is typically less that that of the fossil fuels used to operate the internal combustion engine 16. Additionally, by charging the high voltage battery 68, the plug-in hybrid electric vehicle 10 may be operated in a purely electric mode of operation thereby delaying the need to start the internal combustion engine 16. At step 122, the hybrid vehicle control module 80 will command the heaters 50 and 52 to heat the engine coolant 48 and engine oil 53, respectively. The coolant circulation pump 54 is also commanded by the hybrid vehicle control module 80 thereby circulating the engine coolant 48 through the internal combustion engine 16 to increase the effectiveness of engine coolant heater 50. By heating the engine coolant 48, the internal combustion engine 16 is placed in a favorable condition for starting. With increased temperature of the engine coolant 48, the combustion stability of the internal combustion engine 16 is improved, while the hydrocarbon emission constituents within the products of combustion 32 are reduced. By heating the engine oil 53 with the engine oil heater 52, the viscous friction at engine start-up is reduced thereby reducing the starting effort and increasing the operating efficiency of the internal combustion engine 16. The valve 60 may be selectively opened by the hybrid vehicle control module 80 to enable filling of the insulated storage tank 58 with a predetermined amount of heated engine coolant 48.

The coolant circulation pump 54 operates to pass heated engine coolant 48 through the heater core 56 which, in combination with the fan 76, provides heat to the passenger compartment of the plug-in hybrid electric vehicle 10 for occupant comfort or defrosting purposes as necessary. Additionally, if cooling of the passenger compartment of the plug-in hybrid electric vehicle 10 is required, the hybrid vehicle control module 80 can command the air conditioning compressor 70 to operate in combination with the fan 76.

At step 122, the hybrid vehicle control module 80 will monitor the state of the low voltage battery 74 and control the auxiliary power module 72. If the plug-in hybrid electric vehicle 10 is in a cold ambient environment, the hybrid vehicle control module 80 may command the battery heater 84 to heat the high voltage battery 68. Alternately, if the plug-in hybrid electric vehicle 10 is in a warm ambient environment, the hybrid vehicle control module 80 may command the air conditioning compressor 70 to operate in combination with the fan 76 to cool the high voltage battery 68 thereby increasing the life of the high voltage battery 68. Those skilled in the art will recognize that a dedicated battery cooling fan, such a fan 76, may be used to cool the high voltage battery 68 as opposed to relying solely on the heating, ventilation, and air conditioning system 77.

The thermal program at step 122 also includes heating the combustion chambers 26 of the internal combustion engine 16 by selectively activating the glow plugs 44 and intake air heater 45, thereby placing the internal combustion engine 16 in a more favorable condition for starting. The operation of the glow plugs 44 and intake air heater 45 are commanded by the hybrid vehicle control module 80 through the engine control module 78. The hybrid vehicle control module 80 may also command the catalyst heater 42 to heat the catalyst 40 thereby reducing regulated emission constituents following the starting of the internal combustion engine 16. The engine control module 78 will command the heaters 38 and 38A to heat the respective oxygen sensors 36 and 36A to enable accurate control of the fueling of the internal combustion engine 16 as well as the purge air scrubber heater 85 to improve evaporative emissions system performance. The energy storage device 82 is charged during the thermal program, i.e. step 122 of the method 110.

At step 124, the engine control module 78, hybrid vehicle control module 80, and the high voltage battery control module 86 monitor temperatures and currents of the various devices or components such as, coolant circulation pump 54, air conditioning compressor 70, etc., commanded to operate at step 122. At step 126 the devices commanded to operate at step 122 are controlled within temperature and/or current limits as well as order of precedence. The hybrid vehicle controller 80 ensures that the external power source 64 is not overloaded while performing the thermal program initiated at step 122. Additionally, if the external power source 64 should fail prior to a programmed time or event, the hybrid vehicle control module 80 may alert the operator of the vehicle by flashing lights, sounding a horn, and/or deliver a message to the user interface 88 indicating that the power form the external power source 64 has been interrupted.

At step 128, a determination is made whether the thermal program has timed out. That is, a determination is made as to whether the devices commanded to operate during the thermal program at step 122 have been activated for greater than or equal to a predetermined amount of time. If so, the engine control module 78, hybrid vehicle control module 80, and the high voltage battery control module 86 are deactivated at step 130. Otherwise, the method 110 proceeds to step 132 where a determination is made whether the external power source 64 is still providing power to the plug-in hybrid electric vehicle 10, such as through the umbilical cord 62 or coils 75. If so, the method 110 will loop to step 124. Alternately, the method 110 will proceed to step 134 where the hybrid vehicle control module 80 will enable operation of the plug-in hybrid electric vehicle 10 at step 134. At step 136, the hybrid vehicle control module 80 will execute an electric driving procedure. This may include activating an entertainment system to preprogrammed settings, greeting the operator, and other features and functions programmed into the hybrid vehicle control module 80 through the user interface 88. Additionally, at step 136, the plug-in hybrid electric vehicle 10 may be operated in a purely electric mode of operation relying solely on the motor 20 powered by the high voltage battery 68 to provide drive force to the plug-in hybrid electric vehicle 10.

At step 138 a determination is made as to whether starting of the internal combustion engine 16 is imminent; such as when the state of charge of the high voltage battery 68 drops below a predetermined level or the operator torque request is greater than can be provided by the motor 20. If engine start is not imminent, the method 110 will loop to continuously monitor the engine start criteria. Alternately, the method 110 proceeds to step 140 where an engine start procedure is executed. At step 140, the engine control module 78 allows the energy storage device 82 to discharge thereby activating the catalyst heater 42, which in turn heats the catalyst 40. As mentioned hereinabove, by preheating the catalyst 40, the regulated emission constituents within the products of combustion 32 may be reduced at engine start. Additionally, at step 140, the hybrid vehicle control module 80 commands the valve 60 to open thereby allowing the heated engine coolant 48 contained therein to be circulated through the cylinder block 22 of the internal combustion engine 16. As described hereinabove, by preheating the internal combustion engine 16 prior to start up, hydrocarbon exhaust emissions may be reduced, while combustion stability is increased.

While the best modes for carrying out the invention have been described in detail, those familiar with the art to which this invention relates will recognize various alternative designs and embodiments for practicing the invention within the scope of the appended claims.

The invention claimed is:

1. A method of operating a plug-in hybrid electric vehicle comprising:
    determining whether the plug-in hybrid electric vehicle is receiving power from an external power source;
    disabling the operation of the plug-in hybrid electric vehicle and executing a thermal program if the plug-in hybrid electric vehicle is receiving power from said external power source;
    wherein said thermal program includes charging a high voltage battery and monitoring the state of charge of said high voltage battery;
    determining if the plug-in hybrid electric vehicle continues to receive power said external power source; and
    enabling operation of the plug-in hybrid electric vehicle if the plug-in hybrid electric vehicle is not receiving power from said external power source.

2. The method of operating a plug-in hybrid electric vehicle of claim 1, further comprising energizing at least one of a hybrid vehicle controller, engine controller, high voltage battery controller, and body controller if the plug-in hybrid electric vehicle is receiving power from said external power source.

3. The method of operating a plug-in hybrid electric vehicle of claim 1, wherein said thermal program includes:
    energizing an engine oil heater to heat engine oil for use within an internal combustion engine of the plug-in hybrid electric vehicle;
    monitoring at least one of temperature and current of said engine oil heater; and
    controlling said engine oil heater within at least one of current limits, temperature limits, and precedence of operation.

4. The method of operating a plug-in hybrid electric vehicle of claim 1, wherein said thermal program includes:
    energizing an engine coolant heater to heat engine coolant contained within an internal combustion engine of the plug-in hybrid electric vehicle;
    monitoring at least one of temperature and current of said engine coolant heater; and
    controlling said engine coolant heater within at least one of current limits, temperature limits, and precedence of operation.

5. The method of operating a plug-in hybrid electric vehicle of claim 4, wherein said thermal program includes:
    operating a coolant circulation pump to circulate said engine coolant;
    monitoring current of said coolant circulation pump; and
    controlling said coolant circulation pump within at least one of current limits and precedence of operation.

6. The method of operating a plug-in hybrid electric vehicle of claim 1, wherein said thermal program includes:
    operating a heating, ventilation, and air conditioning system of the plug-in hybrid electric vehicle;
    monitoring at least one of temperature and current of said heating, ventilation, and air conditioning system; and
    controlling said heating, ventilation, and air conditioning system within at least one of current limits, temperature limits, and precedence of operation.

7. The method of operating a plug-in hybrid electric vehicle of claim 1, wherein said thermal program includes one of heating and cooling said high voltage battery.

8. The method of operating a plug-in hybrid electric vehicle of claim 1, wherein said thermal program includes:
    energizing at least one of an intake air heater and a glow plug to heat a combustion chamber within an internal combustion engine of the plug-in hybrid electric vehicle
    monitoring at least one of temperature and current of said at least one of said intake air heater and said glow plug; and
    controlling said at least one of said intake air heater and said glow plug within at least one of current limits, temperature limits, and precedence of operation.

9. The method of operating a plug-in hybrid electric vehicle of claim 1, wherein said thermal program includes:
    energizing an oxygen sensor heater to heat an oxygen sensor mounted with respect to an internal combustion engine;
    monitoring at least one of temperature and current of said oxygen sensor heater; and
    controlling said oxygen sensor heater within at least one of current limits, temperature limits, and precedence of operation.

10. The method of operating a plug-in hybrid electric vehicle of claim 1, wherein said thermal program includes:
   energizing at least one of a purge air scrubber heater and a catalyst heater operable to heat a catalyst mounted with respect to an internal combustion engine;
   monitoring at least one of temperature and current of said at least one of said purge air scrubber heater and said catalyst heater; and
   controlling said at least one of said purge air scrubber heater and said catalyst heater within at least one of current limits, temperature limits, and precedence of operation.

11. The method of operating a plug-in hybrid electric vehicle of claim 1, wherein said thermal program includes
   controlling an auxiliary power module;
   charging a low voltage battery with said auxiliary power module; and
   monitoring the state of charge of said low voltage battery.

12. The method of operating a plug-in hybrid electric vehicle of claim 1, further comprising:
   monitoring said external power source; and
   providing a warning if power from said external power source is interrupted while executing said thermal program.

13. The method of operating a plug-in hybrid electric vehicle of claim 1, further comprising:
   charging a selectively dischargeable energy storage device in selective electrical communication with a catalyst heater;
   determining if an internal combustion engine of the plug-in hybrid electric vehicle will be commanded to start within a predetermined amount of time; and
   energizing said catalyst heater to heat a catalyst by discharging said selectively dischargeable energy storage device if said internal combustion engine will be commanded to start within said predetermined amount of time.

14. The method of operating a plug-in hybrid electric vehicle of claim 1, further comprising:
   filling a selectively dischargeable insulated container with one of heated engine coolant and heated engine oil;
   wherein said selectively dischargeable insulated container is in selective fluid communication with an internal combustion engine of the plug-in hybrid electric vehicle;
   determining if said internal combustion engine will be commanded to start within a predetermined amount of time; and
   heating said internal combustion engine by discharging said one of said heated engine coolant and said heated engine oil within said selectively dischargeable insulated container if said internal combustion engine will be commanded to start within said predetermined amount of time to warm said internal combustion engine.

15. A method of operating a plug-in hybrid electric vehicle having a purely electric mode of operation, wherein at least one electric motor and battery cooperate to provide driving force to the plug-in hybrid electric vehicle, and a hybrid mode of operation, wherein an internal combustion engine is employed to charge the battery and/or provide driving force to the plug-in hybrid electric vehicle, the method comprising:
   operating the plug-in hybrid electric vehicle in the purely electric mode of operation;
   monitoring the battery to determine a state of charge;
   determining if the internal combustion engine will be commanded to start within a predetermined amount of time; and
   performing at least one of heating the internal combustion engine by communicating heated engine coolant contained within a selectively dischargeable insulated container and energizing a catalyst heater to heat a catalyst mounted with respect to the internal combustion engine by discharging a selectively dischargeable energy storage device, if the internal combustion engine will be commanded to start within said predetermined amount of time.

16. The method of operating a plug-in hybrid electric vehicle of claim 15, further comprising:
   starting the internal combustion engine; and
   charging the battery using power generated by the internal combustion engine.

17. A method of operating a plug-in hybrid electric vehicle comprising:
   determining whether an umbilical cord of the plug-in hybrid electric vehicle is plugged into an external power source;
   energizing at least one of a hybrid vehicle controller, engine controller, and high voltage battery controller if said umbilical cord of the plug-in hybrid electric vehicle is plugged into said external power source;
   disabling the operation of the plug-in hybrid electric vehicle and executing a thermal program if said umbilical cord of the plug-in hybrid electric vehicle is plugged into said external power source;
   wherein said thermal program includes charging a high voltage battery and monitoring the state of charge of said high voltage battery;
   determining if said umbilical cord of the plug-in hybrid electric vehicle remains plugged into said external power source; and
   enabling operation of the plug-in hybrid electric vehicle if said umbilical cord of the plug-in hybrid electric vehicle is unplugged from said external power source.

18. The method of operating a plug-in hybrid electric vehicle of claim 17, further comprising:
   charging a selectively dischargeable energy storage device in selective electrical communication with a catalyst heater;
   determining if an internal combustion engine of the plug-in hybrid electric vehicle will be commanded to start within a predetermined amount of time; and
   energizing said catalyst heater to heat a catalyst by discharging said selectively dischargeable energy storage device if said internal combustion engine will be commanded to start within said predetermined amount of time.

19. The method of operating a plug-in hybrid electric vehicle of claim 17, further comprising:
   filling a selectively dischargeable insulated container with heated engine coolant;
   wherein said selectively dischargeable insulated container is in selective fluid communication with an internal combustion engine of the plug-in hybrid electric vehicle;
   determining if said internal combustion engine will be commanded to start within a predetermined amount of time; and
   heating said internal combustion engine by discharging said heated engine coolant within said selectively dischargeable insulated container if said internal combustion engine will be commanded to start within said predetermined amount of time to warm said internal combustion engine.

20. The method of operating a plug-in hybrid electric vehicle of claim 17, wherein said thermal program includes:

operating at least one of an engine oil heater, engine coolant heater, coolant circulation pump, heating, ventilation, and air conditioning system, glow plug, high voltage battery heater, oxygen sensor heater, catalyst heater, and auxiliary power module;

monitoring at least one of temperature and current for said at least one of said engine oil heater, engine coolant heater, coolant circulation pump, heating, ventilation, and air conditioning system, glow plug, high voltage battery heater, oxygen sensor heater, catalyst heater, and auxiliary power module; and controlling said at least one of said engine oil heater, engine coolant heater, coolant circulation pump, heating, ventilation, and air conditioning system, glow plug, high voltage battery heater, oxygen sensor heater, catalyst heater, and auxiliary power module within at least one of current limits, temperature limits, and precedence of operation.

\* \* \* \* \*